(12) United States Patent
Yoshida et al.

(10) Patent No.: US 10,302,458 B2
(45) Date of Patent: May 28, 2019

(54) APPARATUS FOR DYNAMICALLY SENSING A ROTATION ANGLE OF A ROTARY BODY

(71) Applicant: TOYO DENSO CO., LTD., Minato-Ku, Tokyo (JP)

(72) Inventors: Toshiya Yoshida, Tsurugashima (JP); Shoji Kishi, Tsurugashima (JP)

(73) Assignee: Toyo Dense Co., Ltd., Tokyo (JP)

( * ) Notice: Subject to any disclaimer, the term of this patent is extended or adjusted under 35 U.S.C. 154(b) by 0 days.

(21) Appl. No.: 15/342,767

(22) Filed: Nov. 3, 2016

(65) Prior Publication Data

US 2017/0131120 A1    May 11, 2017

(30) Foreign Application Priority Data

Nov. 10, 2015   (JP) .................................. 2015-220386

(51) Int. Cl.
*G01D 5/14*  (2006.01)

(52) U.S. Cl.
CPC ............. *G01D 5/147* (2013.01); *G01D 5/145* (2013.01)

(58) Field of Classification Search
CPC ........ G01D 5/147; G01D 5/142; G01R 15/20; G04C 5/00; G01B 7/30
See application file for complete search history.

(56) References Cited

U.S. PATENT DOCUMENTS

| 6,479,987 | B1 * | 11/2002 | Marx | G01B 7/30 324/207.12 |
| 6,545,462 | B2 | 4/2003 | Schott et al. | |
| 6,570,376 | B2 * | 5/2003 | Matsui | G01D 5/145 324/207.21 |
| 7,308,876 | B2 * | 12/2007 | Schafer | F01L 1/022 123/90.15 |
| 8,350,560 | B2 | 1/2013 | Kammer et al. | |
| 8,638,090 | B2 * | 1/2014 | Hammerschmidt | B82Y 25/00 324/200 |
| 8,664,945 | B2 * | 3/2014 | Laville | G01D 5/145 324/207.2 |
| 8,736,258 | B2 * | 5/2014 | Trontelj | G01D 5/145 324/207.25 |

(Continued)

FOREIGN PATENT DOCUMENTS

| JP | 4936299 B2 | 5/2012 |
| JP | 2014-141251 A | 8/2014 |

*Primary Examiner* — Jay Patidar
(74) *Attorney, Agent, or Firm* — Carrier Blackman & Associates, P.C.; William D. Blackman; Jingli Wang (57) ABSTRACT

A rotation angle detection sensor includes a magnet body subjected to magnetization in an in-plane direction, a first Hall element and a second Hall element separated from each other and arranged offset to one of spaces divided by an imaginary plane including a rotation axis, and a third Hall element located in a position away from a straight line passing through the first Hall element and the second Hall element. A storage section stores a rotation angle that is related to electric signals having a phase difference therebetween, among electric signals of the first Hall element, the second Hall element, and the third Hall element. A detection section detects the electric signals of the first Hall element, the second Hall element, and the third Hall element and obtains from the storage section the rotation angle that is related to the detected electric signals.

13 Claims, 11 Drawing Sheets

(56) References Cited

U.S. PATENT DOCUMENTS

| | | | | |
|---|---|---|---|---|
| 8,854,035 B2* | 10/2014 | Akahane | ................ | G01D 5/145 29/428 |
| 2003/0222642 A1* | 12/2003 | Butzmann | ............... | G01D 5/147 324/207.21 |
| 2006/0066296 A1* | 3/2006 | Kuroyanagi | ........... | G01D 5/145 324/207.2 |
| 2008/0074108 A1* | 3/2008 | Ausserlechner | ....... | G01R 33/07 324/226 |
| 2009/0115409 A1* | 5/2009 | Arinaga | ................ | G01D 5/145 324/207.25 |
| 2009/0315544 A1* | 12/2009 | Takahashi | ............. | F16C 41/007 324/207.25 |
| 2010/0207614 A1* | 8/2010 | Kammer | ............... | F16H 59/044 324/207.25 |
| 2011/0175600 A1* | 7/2011 | Jerance | ................ | G01D 5/145 324/207.25 |
| 2014/0225596 A1* | 8/2014 | Nakamura | ............ | G01R 33/07 324/207.2 |
| 2014/0253106 A1* | 9/2014 | Granig | .................. | G01R 33/06 324/207.14 |
| 2015/0008907 A1* | 1/2015 | Janisch | ................ | G01D 5/145 324/207.25 |

* cited by examiner

APPARATUS FOR DYNAMICALLY SENSING A ROTATION ANGLE OF A ROTARY BODY

BACKGROUND OF THE INVENTION

Field of the Invention

The present invention relates to a rotation angle detection sensor that utilizes a Hall element.

Description of Related Art

Japanese Patent No. 4936299 has disclosed a magnetic field direction detection sensor in which a disc-shaped magnet is coaxially fixed to an axial end of a rotary shaft. The magnet is magnetized along one diameter line thereof. An N-pole is generated at an edge of the magnet along one of semicircles thereof, and an S-pole is generated at an edge of the magnet along the remaining semicircle thereof. A magnetic field is formed based on these N-pole and S-pole. When the rotary shaft rotates, the magnetic field rotates around an axis of the rotary shaft.

A plurality of Hall elements are faced to a surface of the magnet. Each of the Hall elements outputs an electric signal in accordance with a direction and a magnitude of magnetic force lines. The Hall elements are arranged, for example at equal intervals, around a line extended from the axis, and for each diameter line, outputs of two Hall elements are differentially amplified. For detecting a rotation angle (angle position), two output signals having a phase difference therebetween are generated.

In Japanese Patent No. 4936299, the disc-shaped magnet is positioned coaxially with the axis of the rotary shaft. Moreover, the arrangement including the plurality of Hall elements is also positioned coaxially with the axis of the rotary shaft. When a differential amplification signal is disturbed due to positional deviation or unevenness in magnetization, it is difficult to specify the rotation angle.

Japanese Patent Application Laid-open No. 2014-141251 has disclosed one Hall element arranged radially outward of a disc-shaped magnet. Since a shift lever rotates only in a narrow angle range, a rotation angle can be specified by the one Hall element. However, when the angle range is widened, an output of the Hall element and the rotation angle cannot correspond to each other one-on-one, and a transducer device in Japanese Patent Application Laid-open No. 2014-141251 cannot specify the rotation angle. Further, since the magnet has an outer peripheral surface formed as a cylindrical surface that is uniform over its whole periphery, it is not possible to specify a magnetization direction, and therefore it is difficult to arrange the Hall element in a predetermined attitude with respect to the magnetization direction.

SUMMARY OF THE INVENTION

The present invention has been accomplished in light of the above circumstances, and it is an object thereof to provide a rotation angle detection sensor capable of securely specifying a rotation angle as an absolute angle over a wide angle range even when a Hall element is deviated from a position coaxial with a rotation axis of a rotary body.

In order to achieve the object, according to a first aspect of the present invention, there is provided a rotation angle detection sensor, comprising a magnet body subjected to magnetization in an in-plane direction of a first imaginary plane orthogonal to a rotation axis of a rotary body, a first Hall element and a second Hall element separated from each other and arranged within a first one of two spaces divided by a second imaginary plane including the rotation axis, in a magnetic field of the magnet body. The first and second Hall elements are offset relative to the rotation axis. A third Hall element arranged in the first one of the two spaces and in the magnetic field of the magnet body and is located in a position spaced away from a straight line passing through the first Hall element and the second Hall element. The rotation angle detection sensor also includes a storage section for storing a rotation angle that is related to electric signals having a phase difference therebetween, among electric signals of the first Hall element, the second Hall element, and the third Hall element, and that changes according to rotation of the rotary body, and a detection section for detecting the electric signals of the first Hall element, the second Hall element, and the third Hall element and obtaining from the storage section the rotation angle that is related to the detected electric signals.

In accordance with the first aspect, when utilizing the rotation angle detection sensor, the magnet body is fixed to the rotary body. The magnetic field of the magnet body rotates around the rotation axis (the axis) of the rotary body. In a specific position within a three-dimensional space, a direction and a magnitude of magnetic force lines are periodically changed. The change of the magnetic force lines is detected in the first Hall element, the second Hall element, and the third Hall element. An electric signal is generated in each of the first Hall element, the second Hall element, and the third Hall element. Since the Hall elements are arranged offset or deviated to the space spreading to one side from the imaginary plane including the rotation axis, a phase difference is always secured in one of combinations among outputs of the Hall elements. Thus, when outputs having a phase difference therebetween are used, singular points of the electric signals for each rotation angle are securely specified. Even when the Hall elements are set to be deviated from a position coaxial with the rotation axis, the rotation angle detection sensor securely specifies a rotation angle over a wide angle range.

According to a second aspect of the present invention, in addition to the first aspect, the magnetization of the magnet body is set parallel to one straight line.

In accordance with the second aspect, in order to establish the magnetization, it is enough that a material of the magnet body is arranged in one magnetic field, thereby enabling a manufacturing process of the magnet body to be simplified.

According to a third aspect of the present invention, in addition to the second aspect, the magnet body includes one or more planes extending parallel to the one straight line.

In accordance with the third aspect, due to an effect of the planes, a direction of the magnetization can be easily specified. The rotary body and the Hall elements can be precisely positioned with respect to the magnet body.

According to a fourth aspect of the present invention, in addition to the third aspect, the planes are defined as a pair of planes that are parallel to the rotation axis and that are formed on an outer periphery of the magnet body so as to face mutually outward.

In accordance with the fourth aspect, the magnet body can be held by the pair of planes. In such holding, the direction of the magnetization can be precisely set.

According to a fifth aspect of the present invention, in addition to the fourth aspect, a through hole is formed in the magnet body, the rotary body being fitted into the through hole around the rotation axis.

In accordance with the fifth aspect, a space for arranging the magnet body is not required in an axial direction of the rotary body. For example, in a case where the rotary body is supported at both of opposite ends of the rotation axis, the magnet body can be arranged between two support points. Thus, a degree of freedom for arranging the rotary body is increased. Miniaturization of a structural body incorporating the rotary body therein is achieved.

According to a sixth aspect of the present invention, in addition to the fifth aspect, the first Hall element, the second Hall element, and the third Hall element are arranged radially outward of the rotary body.

In accordance with the sixth aspect, a space for arranging the Hall elements is not required in the axial direction of the rotary body. The degree of freedom for arranging the rotary body is increased. Miniaturization of the structural body incorporating the rotary body therein is achieved.

According to a seventh aspect of the present invention, in addition to the fifth aspect, a surface of the magnet body is at least partially covered with a nonmagnetic body.

In accordance with the seventh aspect, the magnet body can be fixed to the rotary body while being placed in contact with an other magnetic body via the nonmagnetic body. At this time, since a space is secured between the magnet body and the other magnetic body by an effect of the nonmagnetic body, it is reduced that a magnetic flux to be distributed on a surface of the magnet body facing the Hall elements is absorbed into the other magnetic body. It is possible to make accurate and stable magnetic flux distribution act on the Hall elements.

According to an eighth aspect of the present invention, in addition to the sixth aspect, the storage section stores measured values of the electric signals specified for each predetermined angle.

In accordance with the eighth aspect, singular points of the electric signals are actually measured for each predetermined angle. Such measured values are stored in the storage section.

According to a ninth aspect of the present invention, in addition to the eighth aspect, the detection section specifies a rotation angle based on interpolation that is set between the measured values adjacent to each other.

In accordance with the ninth aspect, the number of samples of the measured values can be reduced according to the setting of the interpolation. Labor for actual measurement work can be reduced. On the other hand, when the number of the samples is increased, deviation between the interpolation and the measured values is reduced (or eliminated), and thus accuracy in detecting the rotation angle is increased.

According to a tenth aspect of the present invention, in addition to the ninth aspect, there is provided the rotation angle detection sensor, further comprising a fourth Hall element arranged in the one space in the magnetic field of the magnet body and located away from the third Hall element in a position away from the straight line passing through the first Hall element and the second Hall element, a first differential amplifier circuit that is connected to the first Hall element and the second Hall element and differentially amplifies an output of the first Hall element and an output of the second Hall element, a second differential amplifier circuit that is connected to the third Hall element and the fourth Hall element and differentially amplifies an output of the third Hall element and an output of the fourth Hall element.

In accordance with the tenth aspect, the rotation angle detection sensor can precisely detect the rotation angle of the rotary body both coaxially with the rotation axis and on an axis different from the rotation axis.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention are explained below by reference to the attached drawings.

Figure 1:
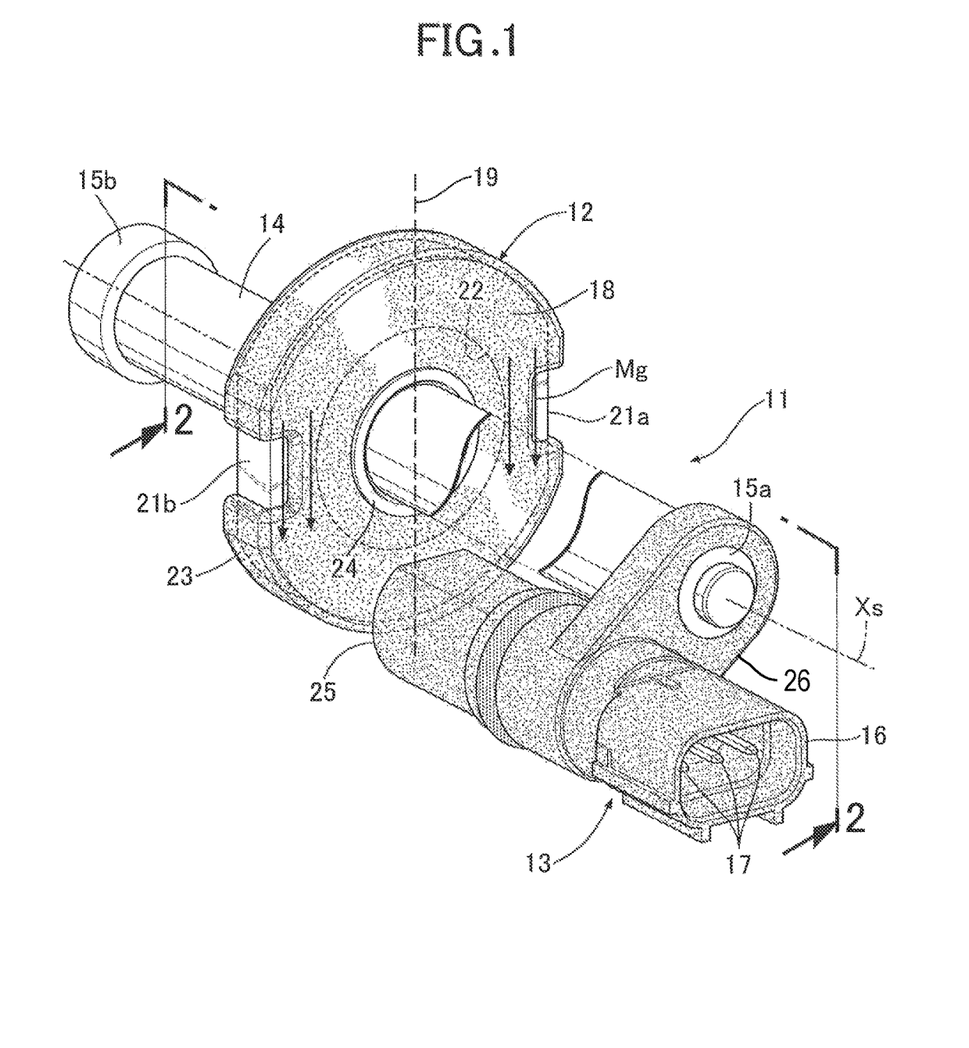
FIG. 1 is a perspective view schematically showing a structure of a rotation angle detection sensor according to an embodiment of the present invention.

FIG. 1 schematically shows a structure of a rotation angle detection sensor 11 according to an embodiment of the present invention. The rotation angle detection sensor 11 includes a magnet unit 12 and a detection unit 13. The magnet unit 12 is mounted on a rotary body 14. Here, the rotary body 14 is formed of a shaft body having a circular section. The rotary body 14 is supported on both sides by a pair of bearings 15a and 15b. The bearings 15a and 15b may be fixed to a structural body incorporating the rotary body 14 therein. The rotary body 14 rotates around a rotation axis Xs.

A coupler 16 is incorporated in the detection unit 13. The coupler 16 includes terminals 17 made of conductive material. A counterpart coupler (not illustrated) is connected to the coupler 16. Here, the coupler 16 is formed into a male type, and the counterpart coupler is formed into a female type and fitted into the coupler 16. For example, a cable is connected to the counterpart coupler. A detection signal of the detection unit 13 can be extracted through the cable from the terminals 17 of the coupler 16. Here, the bearing 15a may be integrated with the detection unit 13. In this case, the detection unit 13 including the bearing 15a may be fixed to the structural body.

Figure 6:
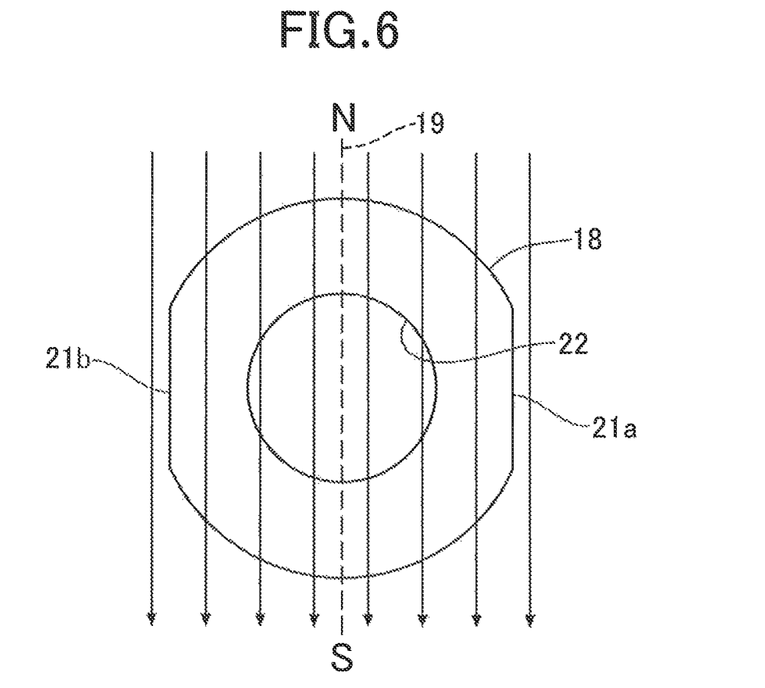
FIG. 6 is a plan view of the magnet body, schematically showing a process for molding the magnet body.

The magnet unit 12 includes a magnet body 18, formed in a modified cylindrical shape and including two flattened side faces disposed on opposite sides of the rotation axis Xs, as shown in FIGS. 1 and 6. The surfaces of these two flattened side faces face outwardly, are uncovered and define first and second parallel planes 21a, 21b. The magnet body 18 is formed of, for example, a permanent magnet. Besides, the magnet body 18 may be formed of an electromagnet. In the magnet body 18, magnetization Mg is established in an in-plane direction of an imaginary plane orthogonal to the rotation axis Xs of the rotary body 14. The magnetization Mg is set parallel to a straight line 19.

The magnet body 18 includes the first and second planes 21a, 21b extending parallel to the straight line 19. Here, the planes 21a and 21b are formed as a pair on an outer peripheral surface of the magnet body 18 so as to face mutually outward. These planes 21a and 21b extend parallel to an imaginary central plane passing through the rotation axis Xs and containing the straight line 19. In such a manner, the planes 21a and 21b indicate a direction of the magnetization Mg. That is, the direction of the magnetization Mg is visualized.

The magnet body 18 includes a through hole 22 on the rotation axis Xs. The rotary body 14 passes through the through hole 22. The through hole 22 may be formed by, for example, defining a cylindrical space coaxial with the rotation axis Xs. The magnet body 18 is arranged between the two bearings 15a and 15b, that is, two support points. The outer peripheral surface of the magnet body 18 is formed of partially cylindrical surfaces extending coaxially with the through hole 22 and connecting the planes 21a and 21b to each other.

The magnet unit 12 includes a covering member 23. The covering member 23 is made of a nonmagnetic material. The covering member 23 may be molded integrally from, for example, a resin material. The covering member 23 covers a surface of the magnet body 18 while exposing the planes 21a and 21b to an outside.

A cylindrical connecting member 24 is embedded in the covering member 23. The connecting member 24 may be made of a metal material such as, for example, aluminum. The rotary body 14 is fitted into the connecting member 24. Thus, the magnet body 18 is connected to the rotary body 14. The magnet body 18 together with the rotary body 14 rotates around the rotation axis Xs. A magnetic body can be placed in contact with a region of the covering member 23 other than a surface of the covering member 23 facing a detection surface 25 of the detection unit 13 during rotation of the rotary body 14. For example, a magnetic metal body can be overlapped on a surface of the covering member 23 opposite to the above-described surface thereof. In this case, since a nonmagnetic space is formed between the magnet body 18 and the magnetic metal body, magnetic force to be absorbed into the magnetic metal body from the magnet body 18 is reduced and magnetic force to flow onto the detection surface 25 of the detection unit 13 is increased. The detection surface 25 of the detection unit 13 is formed at a tip end of the detection unit 13, as described later.

Figure 2:
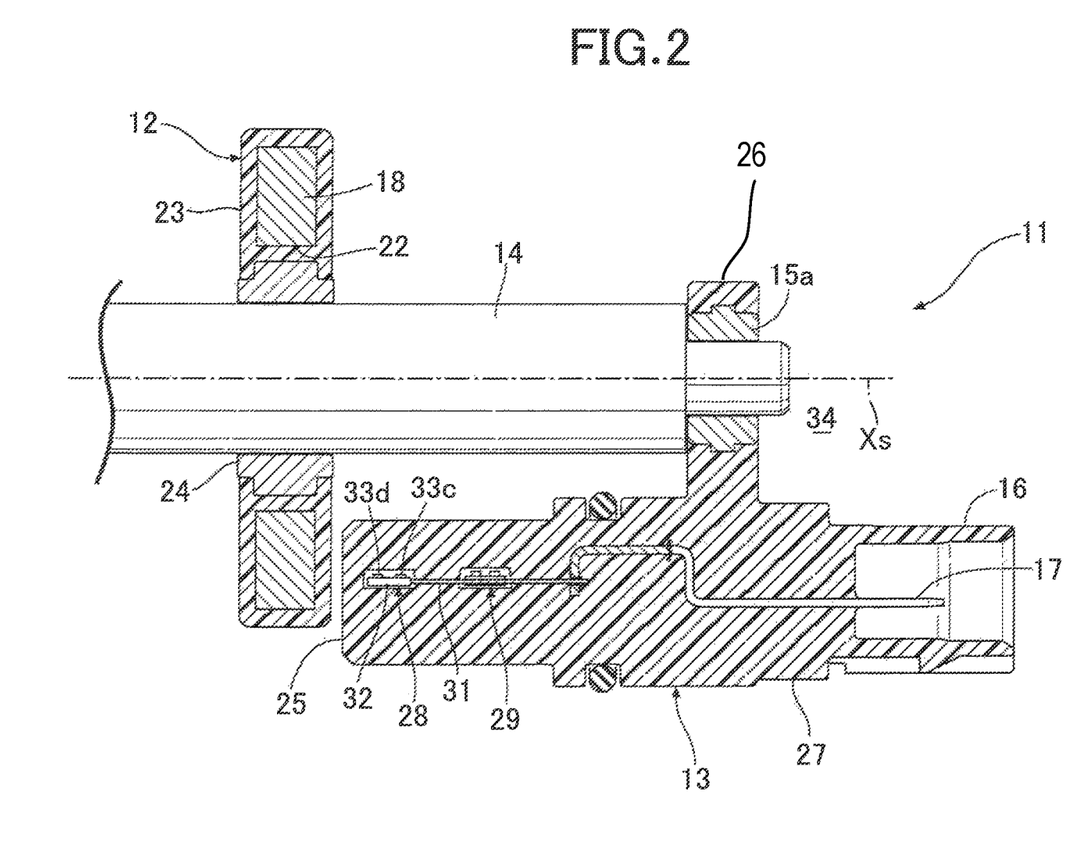
FIG. 2 is a sectional view taken along line 2-2 in FIG. 1.

The detection unit 13 includes a casing 27 disposed on one side of, and laterally spaced away from the rotation axis Xs. The detection unit 13 also includes a bearing boss 26 integrally attached to, and extending laterally outwardly from the casing 27, as shown. The bearing boss 26 houses the bearing 15a therein. The orientation of the bearing boss 26 allows the casing 27 to be disposed on one side of, and laterally spaced away from the rotation axis Xs. As shown in FIG. 2, a Hall element package 28 and an arithmetic processing package 29 are housed in the casing 27. The Hall element package 28 and the arithmetic processing package 29 are connected to each other through a wiring 31 inside the casing 27. The Hall element package 28 and the arithmetic processing package 29 may be integrated with each other. The casing 27 has the coupler 16 at its one end and the detection surface 25 at the other end. Input-output terminals of the arithmetic processing package 29 are electrically connected to the terminals 17 of the coupler 16. The detection surface 25 is disposed in a plane extending parallel to the surface of the magnet body 18.

The Hall element package 28 includes four Hall elements (a first Hall element 33a, a second Hall element 33b, a third Hall element 33c, and a fourth Hall element 33d) that are mounted on a package substrate 32. The Hall elements 33a, 33b, 33c and 33d are arranged in a magnetic field of the magnet body 18 in an offset or deviated manner in relation the rotation axis. The Hall elements are in a space 34 that is one of two spaces divided by the imaginary central plane including the rotation axis Xs. FIG. 2 is a cross-sectional view of the rotation angle detection sensor 11 taken along line 2-2 in FIG. 1. As shown in FIG. 2, the imaginary central plane including the rotation axis Xs bisections in one space and another space 34. Here, the Hall elements 33a, 33b, 33c and 33d are arranged radially outward of the rotary body 14. Accordingly, the casing 27 of the detection unit 13 is at least partially located in parallel with the rotary body 14.

Figure 3:
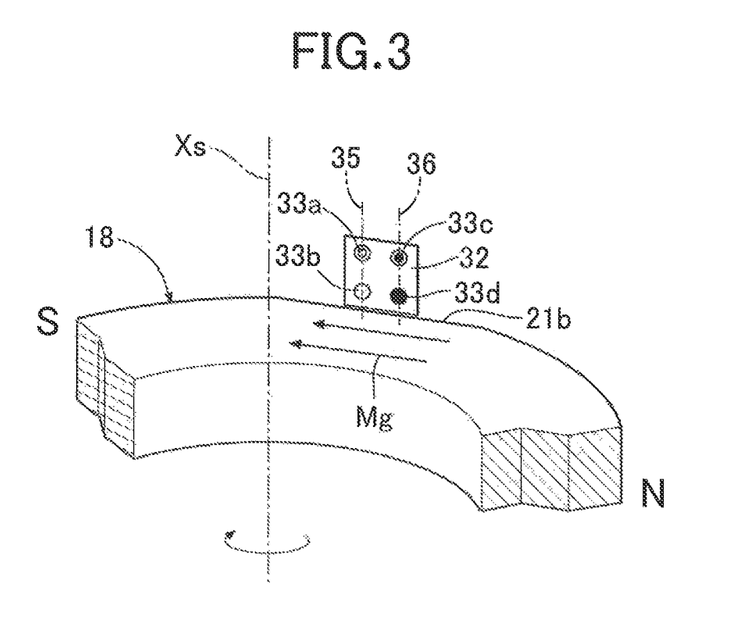
FIG. 3 is a schematic diagram schematically showing a relative positional relationship between Hall elements in a longitudinally placed state and a magnet body.

As shown in FIG. 3, the first Hall element 33a and the second Hall element 33b are arranged to be separated from each other. The third Hall element 33c and the fourth Hall element 33d are located in a position away from a straight line 35 passing through the first Hall element 33a and the second Hall element 33b. The third Hall element 33c and the fourth Hall element 33d are arranged to be separated from each other. Here, the straight line 35 connecting the first Hall element 33a and the second Hall element 33b, and a straight line 36 connecting the third Hall element 33c and the fourth Hall element 33d extend parallel to each other. The Hall elements 33a, 33b, 33c and 33d are respectively arranged on respective vertices of a square that is drawn on a surface of the package substrate 32. Otherwise, the straight line 35 and the straight line 36 may extend side by side while having a crossing angle therebetween, or may cross each other.

Here, the package substrate 32 is placed longitudinally. That is, the surface of the package substrate 32 is faced in parallel to the rotation axis Xs. Moreover, the straight line 35 connecting the first Hall element 33a and the second Hall element 33b, and the straight line 36 connecting the third Hall element 33c and the fourth Hall element 33d are arranged in parallel to the rotation axis Xs. The surface of the package substrate 32 extends within an imaginary plane in contact with an imaginary cylindrical surface coaxial to the rotation axis Xs.

Figure 4:
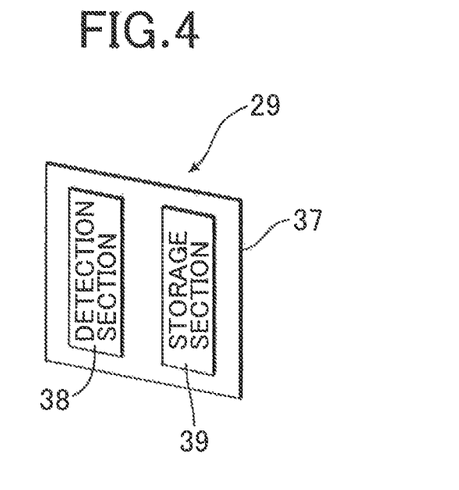
FIG. 4 is an enlarged schematic diagram showing a concept of an arithmetic processing package.

As shown in FIG. 4, the arithmetic processing package 29 includes a detection section 38 and a storage section 39 that are formed on a package substrate 37. The detection section 38 is connected to the storage section 39. The detection section 38 detects electric signals of the first to fourth Hall elements 33a, 33b, 33c and 33d and obtains from the storage section 39 a rotation angle that is related to the detected electric signals. The storage section 39 stores a rotation angle that is related to electric signals having a phase difference therebetween, among electric signals of the first to fourth Hall elements 33a, 33b, 33c and 33d that change according to rotation of the rotary body 14. Here, as the electric signals having a phase difference therebetween, there are used a differential amplification signal of the first Hall element 33a and the second Hall element 33b and a differential amplification signal of the third Hall element 33c and the fourth Hall element 33d.

Figure 5:
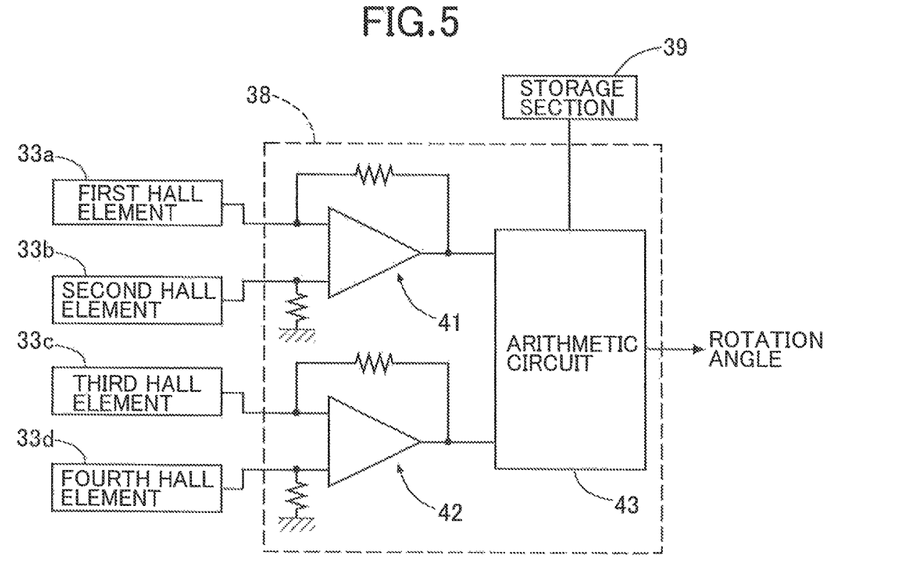
FIG. 5 is a circuit block diagram schematically showing a configuration of the arithmetic processing package.

As shown in FIG. 5, the detection section 38 includes a first differential amplifier circuit 41 that is connected to the first Hall element 33a and the second Hall element 33b and a second differential amplifier circuit 42 that is connected to the third Hall element 33c and the fourth Hall element 33d. In detection of electric signals, the first differential amplifier circuit 41 differentially amplifies an output of the first Hall element 33a and an output of the second Hall element 33b. The first differential amplifier circuit 41 outputs a first detected value. In detection of electric signals, the second differential amplifier circuit 42 differentially amplifies an output of the third Hall element 33c and an output of the fourth Hall element 33d. The second differential amplifier circuit 42 outputs a second detected value. Here, during rotation of the rotary body 14, according to a change in angle thereof, for example, an output of the first differential amplifier circuit 41 and an output of the second differential amplifier circuit 42 each draw a waveform equivalent to a trigonometric function wave. Based on a relative positional relationship between the magnet body 18 and arrangement of the Hall elements 33a, 33b, 33c and 33d, a phase difference is formed between the output of the first differential amplifier circuit 41 and the output of the second differential amplifier circuit 42. According to this phase difference, a singular value is determined for each rotation angle by a combination of the output of the first differential amplifier circuit 41 and the output of the second differential amplifier circuit 42.

The detection section 38 includes an arithmetic circuit 43 that is connected to the first differential amplifier circuit 41 and the second differential amplifier circuit 42. The arithmetic circuit 43 obtains from the storage section 39 a specific rotation angle that is related to the first detected value and the second detected value. Since the singular value is determined by a combination of the first detected value and the second detected value, at least one angle can be extracted during one rotation.

The storage section 39 stores a specific rotation angle for each singular value that is determined by the output of the first differential amplifier circuit 41 and the output of the second differential amplifier circuit 42. Measured values of the output of the first differential amplifier circuit 41 and the output of the second differential amplifier circuit 42 are stored for each predetermined angle ($0° \leq \theta < 360°$) in the storage section 39. When obtaining measured values, the output of the first differential amplifier circuit 41 and the output of the second differential amplifier circuit 42 may be measured at a predetermined angular interval. Here, the outputs are measured in a reference structural body that is in a state approximated to an actual use state. The arithmetic circuit 43 of the detection section 38 specifies a rotation angle based on interpolation that is set between measured values adjacent to each other. The arithmetic circuit 43 may be formed of, for example, a microprocessor, and the storage section 39 may be formed of, for example, a memory circuit.

When the rotary body 14 rotates around the rotation axis Xs, the magnetic field of the magnet body 18 rotates in accordance with the rotation of the rotary body 14. Since distribution of a direction and a magnitude of magnetic force lines exists in a three-dimensional space of the magnetic field, the direction and the magnitude of the magnetic force lines are periodically changed in a specific position within the three-dimensional space. That is, a magnetic flux acted on the Hall elements 33a, 33b, 33c and 33d from the detection surface 25 changes in a cycle of one rotation. The change of the magnetic flux is detected in the Hall elements 33a, 33b, 33c and 33d. An electric signal is generated in each of the Hall elements 33a, 33b, 33c and 33d. Since the Hall elements 33a, 33b, 33c and 33d are arranged offset or deviated to the space 34 extending to one side from the imaginary plane including the rotation axis Xs, a phase difference is secured between the output of the first differential amplifier circuit 41 formed from outputs of the Hall elements 33a and 33b and the output of the second differential amplifier circuit 42 formed from outputs of the Hall elements 33c and 33d. Thus, when outputs having a phase difference therebetween are used, singular points of the electric signals for each rotation angle are securely specified. Even when the Hall elements 33a, 33b, 33c and 33d are deviated from a coaxial position with the rotation axis Xs, the rotation angle detection sensor 11 securely specifies a rotation angle over a wide angle range.

The magnetization Mg of the magnet body 18 is set parallel to the straight line 19 orthogonal to a rotation axis of a rotary body. As shown in FIG. 6, in order to establish the magnetization Mg, it is enough that the material of the magnet body 18 is arranged in one magnetic field, thereby enabling a manufacturing process of the magnet body 18 to be simplified. Here, since the magnet body 18 includes one or more planes extending parallel to the straight line 19, due to an effect of the planes, the direction of the magnetization Mg can be easily specified. The rotary body 14 and the Hall elements 33a, 33b, 33c and 33d can be precisely positioned with respect to the magnet body 18. A magnetic material may be pressed and hardened by means of a die. At this time, the direction from an N-pole to an S-pole may be specified with respect to the pair of planes 21a and 21b.

The planes 21a and 21b are a pair of planes that are formed on an outer periphery of the magnet body 18 so as to face mutually outward. The magnet body 18 can be held by the pair of planes 21a and 21b. In such holding, the direction of the magnetization Mg can be precisely set.

The through hole 22 is formed in the magnet body 18, the rotary body 14 being fitted into the through hole 22 around the rotation axis Xs. Thus, the magnet body 18 is arranged between the two bearings 15a and 15b, that is, two support points. A space for arranging the magnet body 18 is not required in an axial direction of the rotary body 14. As a result, the degree of freedom for arranging the rotary body 14 is increased. Miniaturization of the structural body incorporating the rotary body 14 therein is achieved.

Further, in the rotation angle detection sensor 11, the arithmetic processing package 29 and the Hall element package 28 including the four Hall elements 33a, 33b, 33c and 33d are arranged radially outward of the rotary body 14. Accordingly, a space for arranging the Hall elements is not required in the axial direction of the rotary body 14. The degree of freedom for arranging the rotary body 14 is increased. The miniaturization of the structural body incorporating the rotary body 14 therein is achieved.

The detection surface 25 of the detection unit 13 is faced to the magnet body 18. During rotation of the rotary body 14, the detection surface 25 is continuously faced to an annular belt region that is defined on the surface of the magnet body 18 coaxially with the rotation axis Xs. A magnetic field acts on the Hall elements 33a, 33b, 33c and 33d from this belt region. On the other hand, the magnet body 18 is covered with the covering member 23 which is a nonmagnetic body.

In the storage section 39, an output value of the first differential amplifier circuit 41 and an output value of the second differential amplifier circuit 42 are stored for each predetermined angle. These output values are actually measured in advance in a condition where the rotary body 14 and the rotation angle detection sensor 11 have been incorporated in the reference structural body in a state approximated to an actual use state. Since a phase difference exists between two output values, even if during one rotation of the rotary body 14, each output value changes in a waveform equivalent to a trigonometric function wave, one rotation angle is specified based on a combination of two output values. Accordingly, the storage section 39 stores for each predetermined angle a measured value of the first differential amplifier circuit 41 and a measured value of the second differential amplifier circuit 42.

Meanwhile, the detection section 38 specifies a rotation angle based on interpolation that is set between measured values adjacent to each other. The output value of the first differential amplifier circuit 41 and the output value of the second differential amplifier circuit 42 are interpolated by, for example, linear interpolation. Otherwise, nonlinear interpolation such as interpolation using a spline function and the like may be used instead of the linear interpolation. The number of samples of the measured values can be reduced according to the setting of the interpolation. Labor for actual measurement work can be reduced. On the other hand, when the number of samples is increased, deviation between the interpolation and the measured values is reduced (or eliminated), and thus accuracy in detecting a rotation angle is increased. Output values interpolated for each angle according to a resolution of a rotation angle may be stored in the storage section 39. In this case, a look-up table including measured values and interpolation values may be constructed in the storage section 39.

Figure 7A:
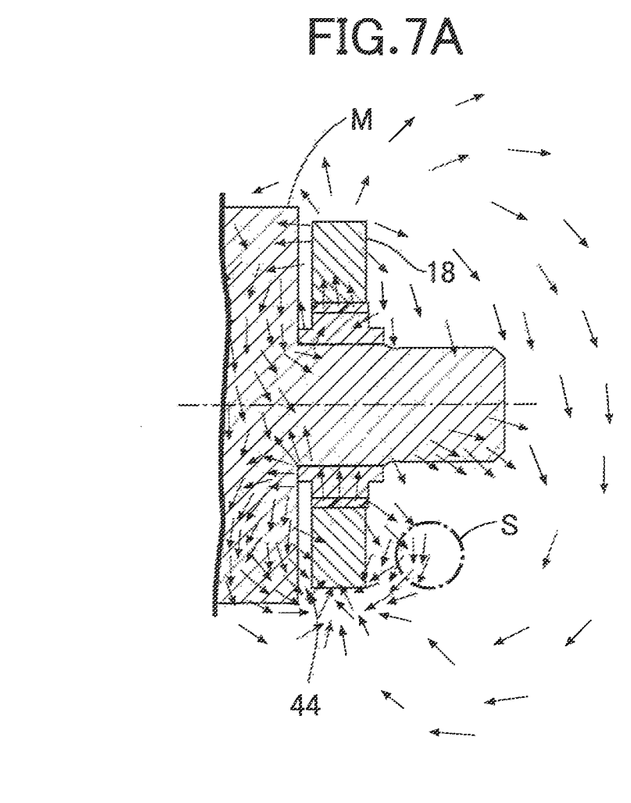
FIGS. 7A and 7B are views each showing a result of magnetic field analysis of CAE (computer-aided engineering).
Figure 7B:
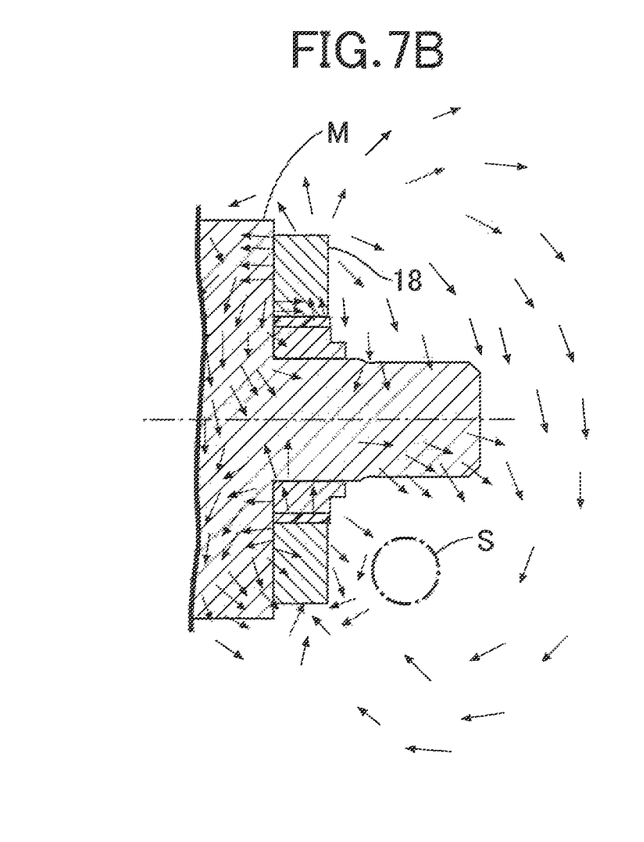

The present inventors observed the magnetic field of the magnet body 18 based on a magnetic field analysis software of CAE (computer-aided engineering). As shown in FIG. 7A, when a space 44 is formed between the magnet body 18 and a magnetic metal body M by the covering member 23 as a nonmagnetic body, it is confirmed that a sufficient magnetic field is formed at a measurement point S. Thus, when the Hall elements 33a, 33b, 33c and 33d are arranged at the measurement point S, sufficient detection sensitivity can be obtained. On the other hand, as shown in FIG. 7B, when a surface of the magnet body 18 opposite to the surface thereof facing the detection surface 25 is placed in direct contact with the magnetic metal body M without the nonmagnetic body interposed between the magnet body 18 and the magnetic metal body M, it is confirmed that intensity of the magnetic field is reduced at the measurement point S.

Figure 8:
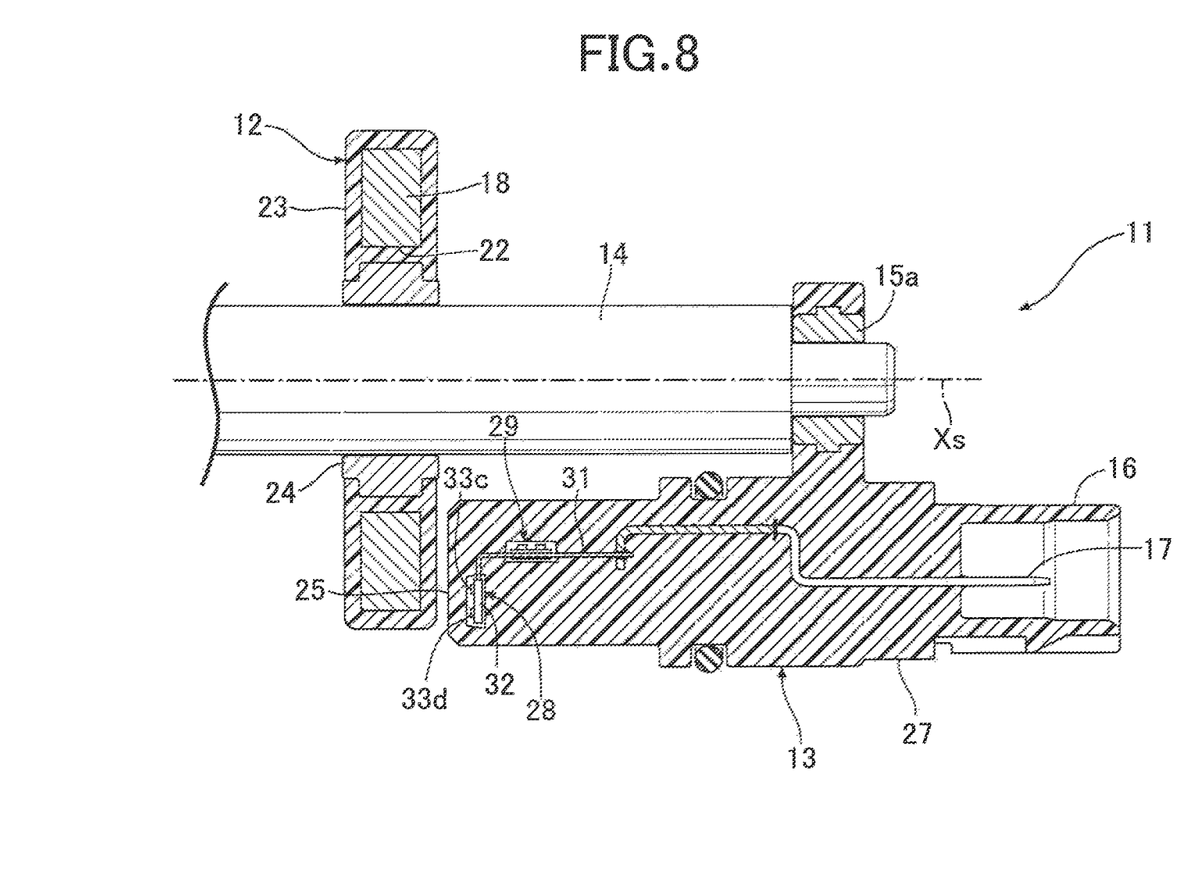
FIG. 8 is a sectional view corresponding to FIG. 2 and schematically showing a Hall element package in a laterally placed state.
Figure 9:
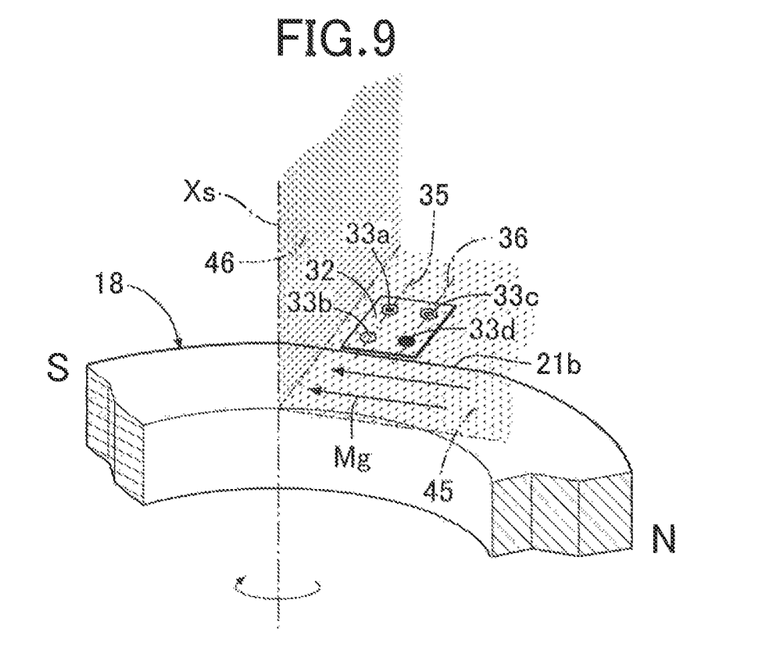
FIG. 9 is a schematic diagram corresponding to FIG. 3 and schematically showing a relative positional relationship between the Hall elements in a laterally placed state and the magnet body.

As shown in FIG. 8, in the rotation angle detection sensor 11, the package substrate 32 may be placed laterally. That is, as shown in FIG. 9, the surface of the package substrate 32 is faced in parallel to an imaginary plane 45 orthogonal to the rotation axis Xs. Moreover, the straight line 35 connecting the first Hall element 33a and the second Hall element 33b, and the straight line 36 connecting the third Hall element 33c and the fourth Hall element 33d are arranged in parallel to one imaginary plane 46 including the rotation axis Xs. Even in such a laterally placed state, the rotation angle detection sensor 11 can function as in the longitudinally placed state described above.

Figure 10:
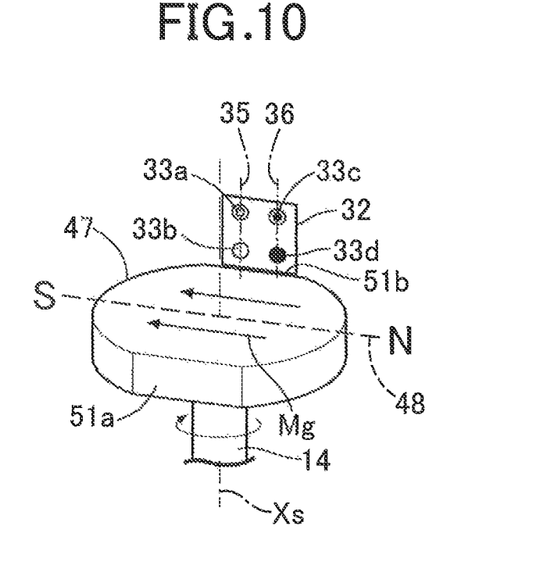
FIG. 10 is a schematic diagram corresponding to FIG. 3 and schematically showing a relative positional relationship between the Hall elements in a longitudinally placed state and a disc-shaped magnet body.
Figure 11:
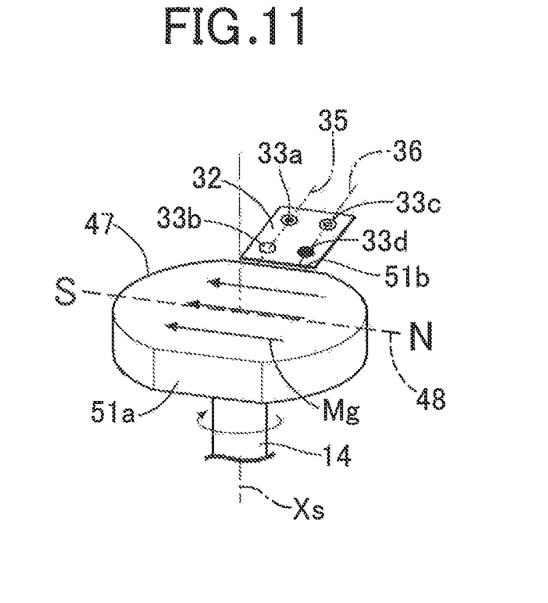
FIG. 11 is a schematic diagram corresponding to FIG. 9 and schematically showing a relative positional relationship between the Hall elements in a laterally placed state and the disc-shaped magnet body.

As shown in FIG. 10 and FIG. 11, a magnet body 47 may be formed in a disc shape. In this case, the magnet body 47 may be coaxially fixed to an axial end of the rotary body 14. The magnet body 47 is magnetized along one diameter line 48. On an outer peripheral surface of the magnet body 47, planes 51a and 51b are formed parallel to the direction of the magnetization Mg. An N-pole is generated at an edge of the magnet body 47 along one of two semicircles thereof, and an S-pole is generated at an edge of the magnet body 47 along the remaining semicircle thereof. A magnetic field is formed based on these N-pole and S-pole. When the rotary body 14 rotates, the magnetic field rotates around the rotation axis Xs.

The Hall elements 33a, 33b, 33c and 33d are arranged offset or deviated to a space that is one of two spaces divided by an imaginary plane including the rotation axis Xs, in the magnetic field of the magnet body 47. The plurality of Hall elements 33a, 33b, 33c and 33d are faced to a surface of the magnet body 47. Each of the Hall elements 33a, 33b, 33c and 33d outputs an electric signal in accordance with a direction and a magnitude of magnetic force lines. In the same manner as the above, two output signals having a phase difference therebetween are generated.

In the same manner as the above, in the storage section 39, an output value of the first differential amplifier circuit 41 and an output value of the second differential amplifier circuit 42 are stored for each predetermined angle. These output values are actually measured in a condition where the rotary body 14 and the rotation angle detection sensor 11 have been incorporated in the structural body. The storage section 39 stores for each predetermined angle a measured value of the first differential amplifier circuit 41 and a measured value of the second differential amplifier circuit 42. Based on an output value of the first differential amplifier circuit 41 and an output value of the second differential amplifier circuit 42, a rotation angle can be securely specified. On the basis of such measured values, influences of positional deviation and unevenness in magnetization can be minimized.

The rotation angle detection sensor 11 as described above is mounted on a vehicle and can be used for a pedal position sensor, a steering angle sensor, a valve position sensor, a wiper motor control, a headlamp position sensor, a seat position sensor, a side mirror control, an electric steering control, a level sensor, main and auxiliary motor controls, and the like. In addition, in consumer applications, the rotation angle detection sensor 11 can be used for a small-sized absolute angle detection rotary encoder, a small-sized input device such as, for example, a mode selector and a volume, a non-contact potentiometer, a rotary switch, and the like.

What is claimed is:

1. A rotation angle detection sensor, comprising:
a magnet body operatively attached to a rotary body for concurrent rotation therewith, the magnet body subjected to magnetization in an in-plane direction orthogonal to a rotation axis of the rotary body, the magnet body having a modified cylindrical shape including two flattened side edge portions which are parallel to and disposed on opposite sides of the rotation axis, wherein a surface of the magnet body is at least partially covered with a nonmagnetic body configured to provide a space between the magnet body and a magnetic metal body which is also attached to the rotary body; and
a stationary detection unit having a casing disposed on one side of, and laterally spaced away from the rotation axis, the detection unit operatively connected to the rotary body and disposed proximate an outer surface side edge of the magnet body, the detection unit comprising:
a first Hall element and a second Hall element, the first and second Hall elements being disposed in the casing, separated from each other and arranged in a magnetic field of the magnet body, a third Hall element disposed in the casing, arranged in the magnetic field of the magnet body and located in a position spaced away from a first straight line passing through the first Hall element and the second Hall element, a storage section for storing a rotation angle that is related to electric signals having a phase difference therebetween among detected electric signals of the first Hall element, the second Hall element, and the third Hall element, the electric signals changing according to rotation of the rotary body, and a detection section for determining a change of the magnetic field from phase differences of the detected electric signals based on the stored rotation angle that is related to the detected electric signals.

2. The rotation angle detection sensor according to claim 1, wherein the magnet body has two axial end surfaces oriented perpendicular to the rotation axis of the rotary body.

3. The rotation angle detection sensor according to claim 2, wherein the magnet body includes two planes defined by the flattened side edge portions thereof and orthogonal to the axial end surfaces of the magnet body.

4. The rotation angle detection sensor according to claim 3, wherein the two planes are parallel to the rotation axis of the rotary body and are formed on an outer periphery of the magnet body so as to face mutually outward.

5. The rotation angle detection sensor according to claim 4, wherein a through hole is formed in the magnet body, the rotary body being fitted into the through hole around the rotation axis.

6. The rotation angle detection sensor according to claim 5, wherein the first Hall element, the second Hall element, and the third Hall element are arranged radially outward of the rotary body.

7. The rotation angle detection sensor according to claim 6, wherein the storage section stores measured values of the electric signals specified for each predetermined angle.

8. The rotation angle detection sensor according to claim 7, wherein the detection section specifies a rotation angle based on interpolation that is set between the measured values adjacent to each other.

9. The rotation angle detection sensor according to claim 8, further comprising a fourth Hall element arranged in the magnetic field of the magnet body and located away from the third Hall element in a position away from the first straight line passing through the first Hall element and the second Hall element, a first differential amplifier circuit that is connected to the first Hall element and the second Hall element and differentially amplifies an output of the first Hall element and an output of the second Hall element, a second differential amplifier circuit that is connected to the third Hall element and the fourth Hall element and differentially amplifies an output of the third Hall element and an output of the fourth Hall element.

10. The rotation angle detection sensor according to claim 1, wherein:

the detection unit has a detection surface facing the magnet body, during rotation of the rotary body, the detection surface is continuously faced to an annular belt region that is defined on a surface of the magnet body, and the magnetic field acts on the first, second and third Hall elements from the belt region.

11. The rotation angle detection sensor according to claim 1, wherein the rotary body and the magnet body are arranged coaxially.

12. The rotation angle detection sensor according to claim 1, wherein part of the casing of the detection unit is parallel to the rotary body.

13. The rotation angle detection sensor according to claim 1, wherein the Hall elements, the storage section and the detection section are housed in the casing of the detection unit.

* * * * *